July 11, 1967 A. RODGERS 3,330,249
VISUAL PRESSURE INDICATING DEVICE
Original Filed Dec. 9, 1963

INVENTOR.
ARTHUR RODGERS
BY *Elliott & Pastoriza*
ATTORNEYS

United States Patent Office 3,330,249
Patented July 11, 1967

3,330,249
VISUAL PRESSURE INDICATING DEVICE
Arthur Rodgers, Northbrook, Ill., assignor, by mesne assignments, to General Fire Extinguisher Corporation, a corporation of Delaware
Continuation of application Ser. No. 328,803, Dec. 9, 1963. This application Aug. 6, 1965, Ser. No. 480,245
3 Claims. (Cl. 116—70)

This is a continuation application of my co-pending application Ser. No. 328,803, filed Dec. 9, 1963, now abandoned, for Visual Pressure Indicating Device.

This invention generally relates to pressure indicating means for various types of pressure vessels and more particularly concerns an improved pressure responsive indicating device for yielding a visual indication of the approximate pressure within a pressure vessel. Although the invention will be described from the standpoint of fire extinguisher tanks, cylinders or vessels, it will be appreciated that the features of the invention will also be of value in all applications in which pressurized fluids are involved and/or in which pressurized vessels are employed.

In the present state of the art, fire extinguishers are normally provided with a pressure gauge which yields through means of a conventional needle and dial an indication of pressure within the fire extinguisher whereby the user is assured that the extinguisher is in proper operating condition. In certain other types of so-called disposable type fire extinguishers which are pressurized with a compressed gas, no pressure gauges are used, and the user can only detect the escape of the compressed gas or a reduction in the pressure by weighing the unit on a sensitive scale. The specifications of the Underwriters Laboratory require that a pressurizing charge of a minimum weight of one and one-half ounces be used in order that a loss in weight of the pressurized charge may be detected to indicate that the extinguisher is not in proper operating condition. Thus, with the disposable type fire extinguisher unit, the only means of detecting a loss of pressure in the unit is to weigh it on a scale which has at least one-quarter ounce graduations and compare its weight with the weight stamped on the unit. In consequence, unless the scales used are very accurate, it is quite difficult to detect a weight and/or pressure loss.

The present invention has as its primary function the provision of a convenient, readily ascertainable, visual means of determining whether or not a fire extinguisher is in a properly pressurized condition.

Thus, it is a primary object of the present invention to provide a relatively precise "go"–"no-go" type of visual pressure indicating means which will enable a viewer of the extinguisher to see whether the pressure within the cylinder or vessel is within or not within proper safe pressurized conditions.

Another object of the present invention is to provide an improved visual type, pressure indicating device, which may be manufactured from a small number of parts and which thereafter may be readily assembled into a construction for convenient mounting in the sidewalls of a pressure vessel.

A further object of the present invention is to provide an improved pressure responsive, visual indicating device which may be mounted in the sidewalls of a vessel and yet which is relatively rugged in its construction and does not require any appreciable maintenance or care.

Still a further object of the present invention is to provide an improved pressure responsive indicating device for yielding a visual indication of the pressure within a vessel, which is relatively economical to construct, and which does not embody any moving mechanical parts, whereby the indicating device is not subject to appreciable deterioration over a period of time.

These and other objects and advantages of the present invention are generally achieved by providing a pressure responsive indicating device which is designed to be mounted in the sidewalls of a pressure vessel. The device comprises a hollow closed member for coupling to the sidewalls. The member defines a bellows portion at one end and a transparent closure at its opposite end. The bellows portion is designed to be exposed to pressure within the vessel.

A liquid, which has the property of retaining low viscosity throughout a wide range of temperatures is disposed within the hollow member. In accordance with a feature of the present invention, a compressible member characterized by a density at atmospheric pressure slightly less than the specific gravity of the liquid, is in turn floating within the liquid adjacent the transparent member.

The density of the compressible member is such that upon an increase in pressure within the extinguisher to the proper limits, the compressible member is caused to decrease in volume and thereby increase in density such that it will sink within the liquid down towards the end where the bellows portion is located. In consequence, the viewer of the extinguisher will have a ready visual indication of whether or not the extinguisher is properly charged or not.

A better understanding of the present invention will be had by reference to the drawings, showing merely one illustrative embodiment, and in which:

In FIGURE 1, the device is shown in its configuration when the vessel is not charged.

Figure 1:
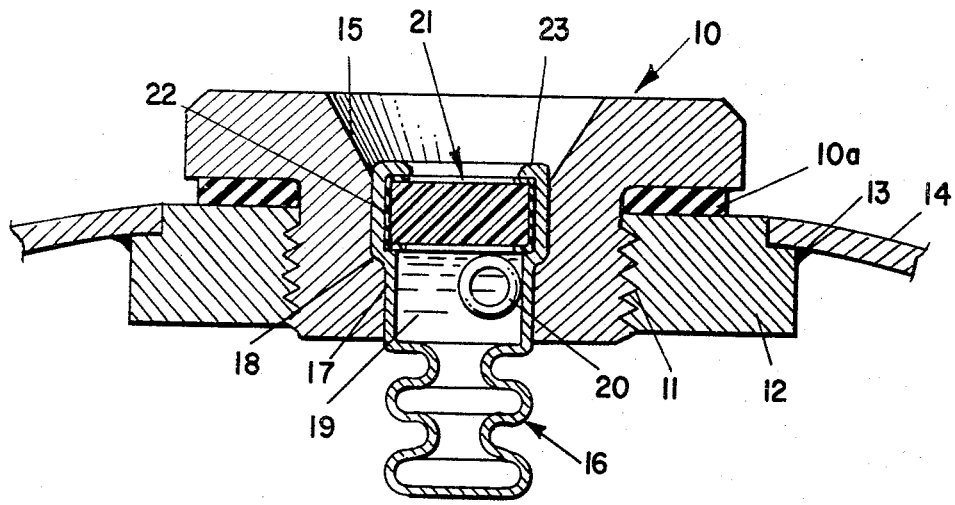
FIGURE 1 is a view of the visual type pressure indicating device of the present invention connected into the sidewalls of a pressure vessel, the latter being shown only fragmentarily.

Referring now to the drawings, there is shown in FIGURE 1, a plug member 10 for mounting in the sidewalls of a pressure vessel. The plug member 10 serves the dual function of retaining the pressure indicating device and also providing a means of securely coupling this device to the sidewalls of the vessel. Towards this end, the plug 10 is provided with a threaded portion 11 designed to be received in an internally threaded collar 12 which may be welded or otherwise rigidly secured as at 13 to the sidewalls 14 of the pressure vessel or fire extinguisher tank. In an alternate construction (not shown) the plug 10 could be screwed directly into the sidewalls 14 of the tank.

In order to assure proper sealing of the plug 10 to the sidewalls 14, an annular seal 10a may be inserted between the outer nut portion of the plug 10 and the sidewalls 14 to prevent any possibility of fluid leakage.

Figure 2:
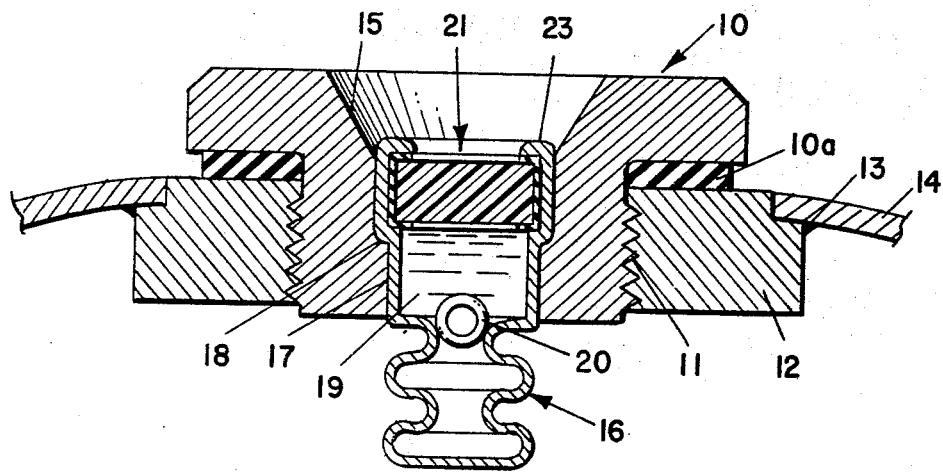
FIGURE 2 is a view of the pressure responsive indicating device of FIGURE 1 after the vessel has been properly charged such that the bellows has been subjected to the fluid pressure therein and the bead decreased somewhat in diameter as will be more fully explained in the specification that hereafter follows.

The plug 10 is provided with a bore 15 designed to receive a metal bellows structure 16 which has an upper portion 17 (as viewed in FIGURES 1 and 2) that may be brazed or otherwise sealably and rigidly secured to the metal portion of the bore 15.

The upper portion of the bellows structure 16 is somewhat enlarged in diameter to fit on a shoulder 18 in the bore 15. A liquid 19 is designed to be received within the bellows structure 16. Preferably, the liquid has a relatively low viscosity throughout a wide range of temperatures such that it will maintain its liquid properties for proper functioning of the device in the manner as hereafter explained. After the liquid 19 has been placed in the bellows structure 16, a small compressible member 20 in the form of a plastic bead, for example, is deposited in the liquid. Thereafter, a transparent cover member 21 is placed over the liquid in the upper portion of the bellows structure 16 to cover the liquid. Again, in order to prevent any possible fluid leakage of the liquid 19, a seal 22 may be provided around the closure member 21.

After these parts have been assembled, the upper annular edge of the bellows structure 16 is crimped over as at 23 in order to firmly retain the cover member 21, and the fluid 19 and compressible bead 20 within the bellows member 16.

The bellows member 16 together with the transparent cover member 21 defines a closed hollow member in which the liquid 19 and bead 20 are disposed. It is essential that the cover 21 be either transparent or translucent such that the bead or other compressible member 20 within the bellows member 16 may be viewed by any person endeavoring to ascertain the pressurized condition of the vessel.

The operation of the improved pressure indicating device of the present invention may be described as follows. At normal atmospheric pressure, the compressible member or bead 20 is designed to have a density slightly less than the specific gravity of the particular liquid 19 used within the bellows structure 16. As a consequence, the bead 20 will tend to rise towards the surface of the liquid 19 to a position adjacent the transparent end cover 21. Towards the end, the plug 10 would normally be physically positioned as in FIGURES 1 and 2. By proper construction, the bead 19 can be designed such that once the pressure within the extinguisher tank reaches a given desired level, the bead will decrease sufficiently in diameter such that its density will be greater than the density of the liquid 19, whereby the bead 20 will tend to sink into the position, for example, shown in FIGURE 2. It will be appreciated that in order for the bead to increase in density, the pressure of the fluid within the tank sidewalls 14 must be transmitted through the bellows 16 and the liquid 19. In consequence, as heretofore mentioned, the fluid 19 must always be maintained in its liquid state and have a relatively low and substantially constant viscosity throughout a wide range of temperatures. In this regard, it is also to be noted that the specific gravity of the liquid 19 must also be relatively constant, a characteristic which will undoubtedly be true if the liquid maintains its low viscosity characteristic throughout a wide range of temperatures.

It is, of course, also evident that the transparent cover 21 must be constructed of material such that it will not be attacked by the liquid 19.

It will be appreciated that the compressible member or bead 20 must be of precise dimensions and weight in order to have this improved pressure indicating device function properly. Towards this end, production of these beads could be carried out by first immersing them in a liquid of known specific gravity. Beads that were heavier than required would sink to the bottom and beads which were acceptable would float. If the acceptable beads were then removed and placed in another liquid of slightly less specific gravity than the first liquid, some would float and some would sink. Beads which floated in the first liquid and sank in the second liquid would then be acceptable beads and by closely controlling the specific gravities of the two liquids, it would be possible to precisely control the manufacture of the beads. Of course, as heretofore stated, the specific gravity of the liquid 19 employed and its viscosity must be relatively constant throughout a wide range of temperatures to maintain proper functioning of the device.

It will be appreciated that various minor changes may be made in construction of the present pressure indicating device without departing from the spirit and scope of the invention as set forth in the following claims.

What is claimed is:

1. In combination with a fire extinguisher tank containing pressurized fluid: a pressure responsive indicating device including: a plug member threadedly coupled in the sidewalls of said tank; a hollow member coaxially mounted in said plug member, said hollow member having an inner closed portion of bellows construction extending from the inner end of said plug member to be exposed to said pressurized fluid, and an outer portion terminating short of the outer end of said plug member and characterized by an open end having an annular flange; a relatively transparent member mounted within said outer portion within the confines of said plug member so as to close off said open end, said annular flange being crimped over said transparent member around the edges thereof to retain said transparent member within said outer portion of said hollow member and to sealably close off said outer portion of said hollow member; liquid disposed within said hollow member; a compressible member disposed in said liquid and normally having a density at atmospheric pressure slightly less than the specific gravity of said liquid, said compressible member being caused to increase in density to a point higher than the specific gravity of said liquid in response to pressurization of said tank and the resultant force exerted upon said bellows portions, whereby the liquid within said hollow member transmits said pressure to said compressible member to increase the density thereof and cause said compressible member to sink towards the bottom of said hollow vessel.

2. The combination, according to claim 1, in which said compressible member comprises a hollow plastic bead.

3. The combination, according to claim 1, in which said bellows member is formed of metal.

References Cited

UNITED STATES PATENTS

| 1,646,968 | 10/1927 | Louder | 73—403 |
| 2,114,105 | 4/1938 | Gerber | 116—65 |
| 2,188,177 | 1/1940 | Dube | 73—410 |
| 2,614,427 | 10/1952 | Hunter et al. | 73—299 |
| 2,689,481 | 9/1954 | Quiat | 73—410 |
| 2,690,675 | 10/1954 | Farrier | 73—403 |
| 2,696,738 | 12/1954 | Lupfer | 73—299 |
| 2,701,966 | 2/1955 | Brown | 73—403 |
| 2,751,928 | 6/1956 | Rook | 137—453 |
| 2,757,632 | 8/1956 | Wittlin | 116—117 |
| 2,827,122 | 3/1958 | Clark | 116—117 |
| 2,838,071 | 6/1958 | Wood | 73—410 |
| 3,055,219 | 9/1962 | Wilson et al. | 73—410 |
| 3,101,068 | 8/1963 | Jensen | 116—70 |

LOUIS J. CAPOZI, *Primary Examiner.*